United States Patent
Li

(10) Patent No.: US 11,762,680 B2
(45) Date of Patent: Sep. 19, 2023

(54) METHOD AND SYSTEM OF HOST RESOURCE UTILIZATION REDUCTION

(71) Applicant: ALIBABA GROUP HOLDING LIMITED, Grand Cayman (KY)

(72) Inventor: Shu Li, San Mateo, CA (US)

(73) Assignee: Alilbaba Group Holding Limited, Grand Cayman (KY)

(*) Notice: Subject to any disclaimer, the term of this patent is extended or adjusted under 35 U.S.C. 154(b) by 406 days.

(21) Appl. No.: 17/075,256

(22) Filed: Oct. 20, 2020

(65) Prior Publication Data
US 2022/0121464 A1 Apr. 21, 2022

(51) Int. Cl.
*G06F 9/455* (2018.01)
*G06F 12/02* (2006.01)

(52) U.S. Cl.
CPC ...... *G06F 9/45558* (2013.01); *G06F 12/0246* (2013.01); *G06F 2009/45575* (2013.01); *G06F 2009/45583* (2013.01); *G06F 2212/152* (2013.01); *G06F 2212/7201* (2013.01)

(58) Field of Classification Search
CPC ............. G06F 9/45558; G06F 12/0246; G06F 2009/45575; G06F 2009/45583; G06F 2212/152; G06F 2212/7201; G06F 12/109; G06F 2212/151; G06F 2212/651; G06F 9/45533
See application file for complete search history.

(56) References Cited

U.S. PATENT DOCUMENTS

| | | | |
|---|---|---|---|
| 2014/0223096 A1* | 8/2014 | Zhe Yang | G06F 3/0665 711/114 |
| 2017/0177222 A1* | 6/2017 | Singh | H04L 67/1097 |
| 2017/0329546 A1* | 11/2017 | Chen | G06F 3/0653 |
| 2018/0307521 A1* | 10/2018 | Pinto | G06F 13/00 |
| 2020/0004443 A1* | 1/2020 | Secatch | G06F 3/0659 |
| 2020/0004455 A1* | 1/2020 | Williams | G06F 12/0246 |
| 2020/0050403 A1* | 2/2020 | Suri | G06F 3/0659 |
| 2020/0218465 A1* | 7/2020 | Klein | G06F 3/0604 |
| 2020/0319966 A1* | 10/2020 | Kanno | G06F 3/0664 |
| 2021/0263762 A1* | 8/2021 | Kachare | G06F 12/0868 |
| 2022/0066807 A1* | 3/2022 | Kashyap | G06F 3/0631 |

* cited by examiner

*Primary Examiner* — Kenneth Tang
(74) *Attorney, Agent, or Firm* — Finnegan, Henderson, Farabow, Garrett & Dunner, LLP

(57) ABSTRACT

The present disclosure provides methods, systems, and non-transitory computer readable media for optimizing data storing. An exemplary system comprises: a flash drive comprising a plurality of dies; and a memory configured to store a mapping associating a first virtual machine with a first set of dies of the plurality of dies and a second virtual machine with a second set of dies of the plurality of dies, wherein: the first set of dies are hibernated in response to the first virtual machine changing to an inactive state; and the first set of dies are activated in response to the first virtual machine changing to an active state.

21 Claims, 9 Drawing Sheets

METHOD AND SYSTEM OF HOST RESOURCE UTILIZATION REDUCTION

TECHNICAL FIELD

The present disclosure generally relates to data storage, and more particularly, to methods, systems, and non-transitory computer readable media for optimizing performance of a storage drive.

BACKGROUND

Cloud service providers deploy a tremendous number of servers to provide a broad spectrum of users with a virtualized computing environment to meet their computing and storage requirements. In a virtualized environment, data is stored on drives. Traditionally, hard disk drives ("HDDs") were used for this purpose, but computer systems and servers are increasingly turning to solid-state drives ("SSDs") as their secondary storage units. SSDs implement management firmware that is operated by microprocessors inside the SSDs for functions, performance, and reliability. While offering significant advantages over HDDs, the management mechanism of SSDs experience difficulties in meeting more demanding requirements on drive performance and power.

SUMMARY OF THE DISCLOSURE

Embodiments of the present disclosure provide a method. An exemplary method comprises: receiving a status update for a virtual machine, wherein the virtual machine stores data in a flash drive, the flash drive comprises a plurality of dies, and one or more dies from the plurality of dies correspond to the virtual machine; determining, according to the status update, if the virtual machine has changed to an active state or an inactive state; and in response to a determination that the virtual machine has changed, updating a status of the one or more dies that correspond to the virtual machine, wherein the status of the one or more dies is updated to hibernating in response to the determination that the virtual machine has changed to the inactive state, and the status of the one or more dies is updated to activated in response to the determination that the virtual machine has changed to the active state.

Embodiments of the present disclosure further provide a system. An exemplary system comprises a flash drive comprising a plurality of dies; and a memory configured to store a mapping associating a first virtual machine with a first set of dies of the plurality of dies and a second virtual machine with a second set of dies of the plurality of dies, wherein: the first set of dies are hibernated in response to the first virtual machine changing to an inactive state; and the first set of dies are activated in response to the first virtual machine changing to an active state.

Embodiments of the present disclosure further provide a non-transitory computer readable medium that stores a set of instructions that is executable by at least one processor of a computer system to cause the computer system to perform a method, the method comprising: receiving a status update for a virtual machine, wherein the virtual machine stores data in a flash drive, the flash drive comprises a plurality of dies, and one or more dies from the plurality of dies correspond to the virtual machine; determining, according to the status update, if the virtual machine has changed to an active state or an inactive state; and in response to a determination that the virtual machine has changed, updating a status of the one or more dies that correspond to the virtual machine, wherein the status of the one or more dies is updated to hibernating in response to the determination that the virtual machine has changed to the inactive state, and the status of the one or more dies is updated to activated in response to the determination that the virtual machine has changed to the active state.

DETAILED DESCRIPTION

Figure 1:
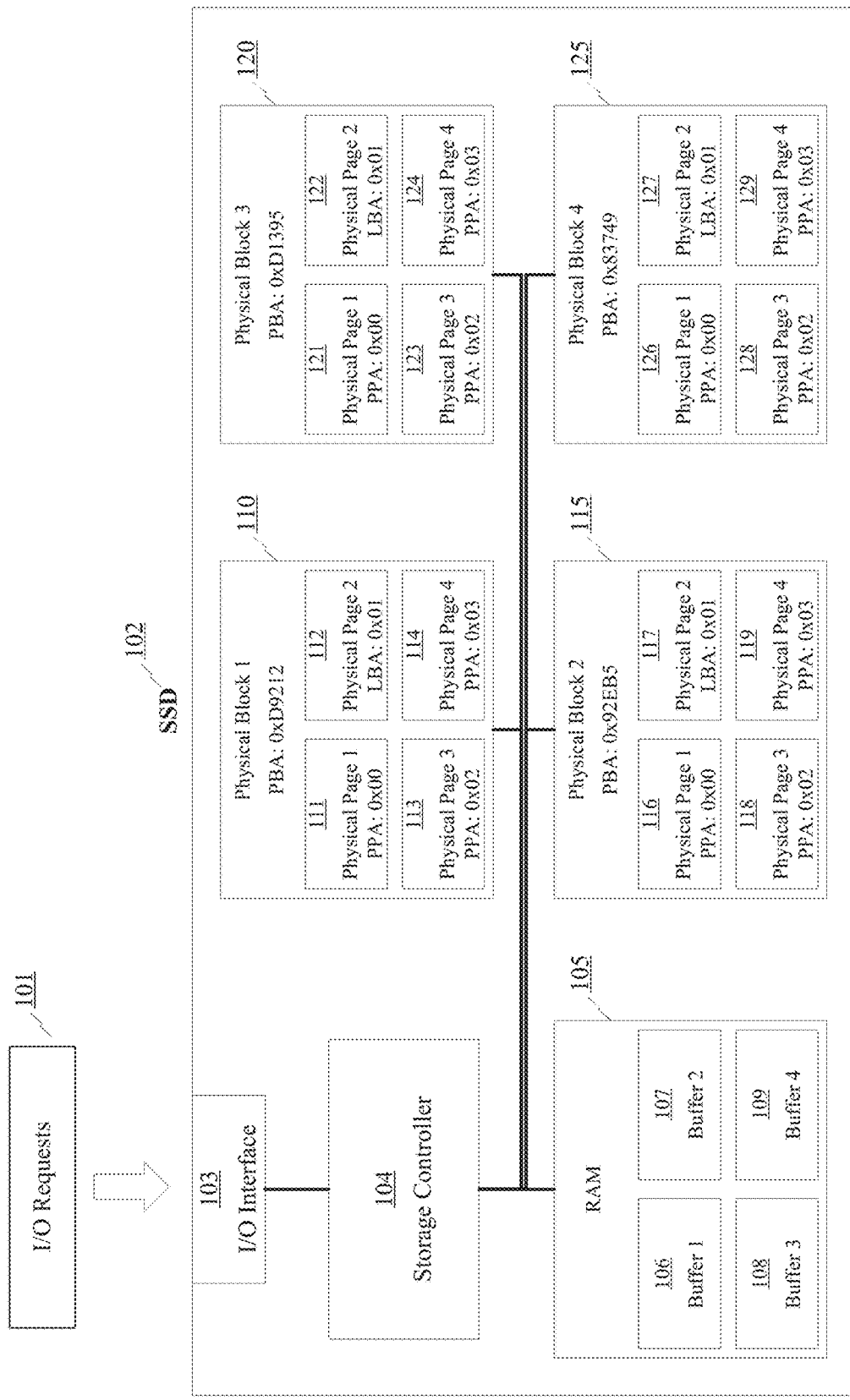
FIG. 1 is an example schematic illustrating a basic layout of an SSD, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Modern day computers are based on the Von Neuman architecture. As such, broadly speaking, the main components of a modern-day computer can be conceptualized as two components: something to process data, called a processing unit, and something to store data, called a primary storage unit. The processing unit (e.g., CPU) fetches instructions to be executed and data to be used from the primary storage unit (e.g., RAM), performs the requested calculations, and writes the data back to the primary storage unit. Thus, data is both fetched from and written to the primary storage unit, in some cases after every instruction cycle. This means that the speed at which the processing unit can read from and write to the primary storage unit can be important to system performance. Should the speed be insufficient, moving data back and form becomes a bottleneck on system performance. This bottleneck is called the Von Neumann bottleneck.

High speed and low latency are factors in choosing an appropriate technology to use in the primary storage unit. Modern day systems typically use DRAM. DRAM can transfer data at dozens of GB/s with latency of only a few nanoseconds. However, in maximizing speed and response time, there can be a tradeoff. DRAM has three drawbacks. DRAM has relatively low density in terms of amount of data stored, in both absolute and relative measures. DRAM has a much lower ratio of data per unit size than other storage technologies and would take up an unwieldy amount of space to meet current data storage needs. DRAM is also significantly more expensive than other storage media on a price per gigabyte basis. Finally, and most importantly, DRAM is volatile, which means it does not retain data if power is lost. Together, these three factors make DRAM not as suitable for long-term storage of data. These same limitations are shared by most other technologies that possess the speeds and latency needed for a primary storage device.

In addition to having a processing unit and a primary storage unit, modern-day computers also have a secondary storage unit. What differentiates primary and secondary storage is that the processing unit has direct access to data in the primary storage unit, but not necessarily the secondary storage unit. Rather, to access data in the secondary storage unit, the data from the second storage unit is first transferred to the primary storage unit. This forms a hierarchy of storage, where data is moved from the secondary storage unit (non-volatile, large capacity, high latency, low bandwidth) to the primary storage unit (volatile, small capacity, low latency, high bandwidth) to make the data available to process. The data is then transferred from the primary storage unit to the processor, perhaps several times, before the data is finally transferred back to the secondary storage unit. Thus, like the link between the processing unit and the primary storage unit, the speed and response time of the link between the primary storage unit and the secondary storage unit are also important factors to the overall system performance. Should its speed and responsiveness prove insufficient, moving data back and forth between the memory unit and secondary storage unit can also become a bottleneck on system performance.

Traditionally, the secondary storage unit in a computer system was HDD. HDDs are electromechanical devices, which store data by manipulating the magnetic field of small portions of a rapidly rotating disk composed of ferromagnetic material. But HDDs have several limitations that make them less favored in modern day systems. In particular, the transfer speeds of HDDs are largely stagnated. The transfer speed of an HDD is largely determined by the speed of the rotating disk, which begins to face physical limitations above a certain number of rotations per second (e.g., the rotating disk experiences mechanical failure and fragments). Having largely reached the current limits of angular velocity sustainable by the rotating disk, HDD speeds have mostly plateaued. However, CPU's processing speed did not face a similar limitation. As the amount of data accessed continued to increase, HDD speeds increasingly became a bottleneck on system performance. This led to the search for and eventually introduction of a new memory storage technology.

The storage technology ultimate chosen was flash storage or flash drives. A flash drive is composed of circuitry, principally logic gates composed of transistors. Since flash storage stores data via circuitry, flash storage is a solid-state storage technology, a category for storage technology that does not have (mechanically) moving components. A solid-state based device has advantages over electromechanical devices such as HDDs, because solid-state devices does not face the physical limitations or increased chances of failure typically imposed by using mechanical movements. Flash storage is faster, more reliable, and more resistant to physical shock. As its cost-per-gigabyte has fallen, flash storage has become increasingly prevalent, being the underlying technology of flash drives, SD cards, the non-volatile storage unit of smartphones and tablets, among others. And in the last decade, flash storage has become increasingly prominent in PCs and servers in the form of SSDs.

SSDs are, in common usage, secondary storage units based on flash technology. Technically referring to any secondary storage unit that does not involve mechanically moving components like HDDs, SSDs are made using flash technology. As such, SSDs do not face the mechanical limitations encountered by HDDs. SSDs have many of the same advantages over HDDs as flash storage such as having significantly higher speeds and much lower latencies. However, SSDs have several special characteristics that can lead to a degradation in system performance if not properly managed. In particular, SSDs must perform a process known as garbage collection before the SSD can overwrite any previously written data. The process of garbage collection can be resource intensive, degrading an SSD's performance.

The need to perform garbage collection is a limitation of the architecture of SSDs. As a basic overview, SSDs are made using floating gate transistors, strung together in strings. Strings are then laid next to each other to form two dimensional matrices of floating gate transistors, referred to as blocks. Running transverse across the strings of a block (so including a part of every string), is a page. Multiple blocks are then joined together to form a plane, and multiple planes are formed together to form a NAND die of the SSD, which is the part of the SSD that permanently stores data. Blocks and pages are typically conceptualized as the building blocks of an SSD, because pages are the smallest unit of data which can be written to and read from, while blocks are the smallest unit of data that can be erased.

FIG. 1 is an example schematic illustrating a basic layout of an SSD, according to some embodiments of the present disclosure. As shown in FIG. 1, an SSD 102 comprises an I/O interface 103 through which the SSD communicates to a host system via input-output ("I/O") requests 101. Connected to the I/O interface 103 is a storage controller 104, which includes processors that control the functionality of the SSD. Storage controller 104 is connected to RAM 105, which includes multiple buffers, shown in FIG. 1 as buffers 106, 107, 108, and 109. Storage controller 104 and RAM 105 are connected to physical blocks 110, 115, 120, and 125. Each of the physical blocks has a physical block address ("PBA"), which uniquely identifies the physical block. Each of the physical blocks includes physical pages. For example, physical block 110 includes physical pages 111, 112, 113, and 114. Each page also has its own physical page address ("PPA"), which is unique within its block. Together, the physical block address along with the physical page address uniquely identifies a page—analogous to combining a 7-digit phone number with its area code. Omitted from FIG. 1 are planes of blocks. In an actual SSD, a storage controller is connected not to physical blocks, but to planes, each of which is composed of physical blocks. For example, physical blocks 110, 120, 115, and 125 can be on a sample plane, which is connected to storage controller 104.

Figure 2:
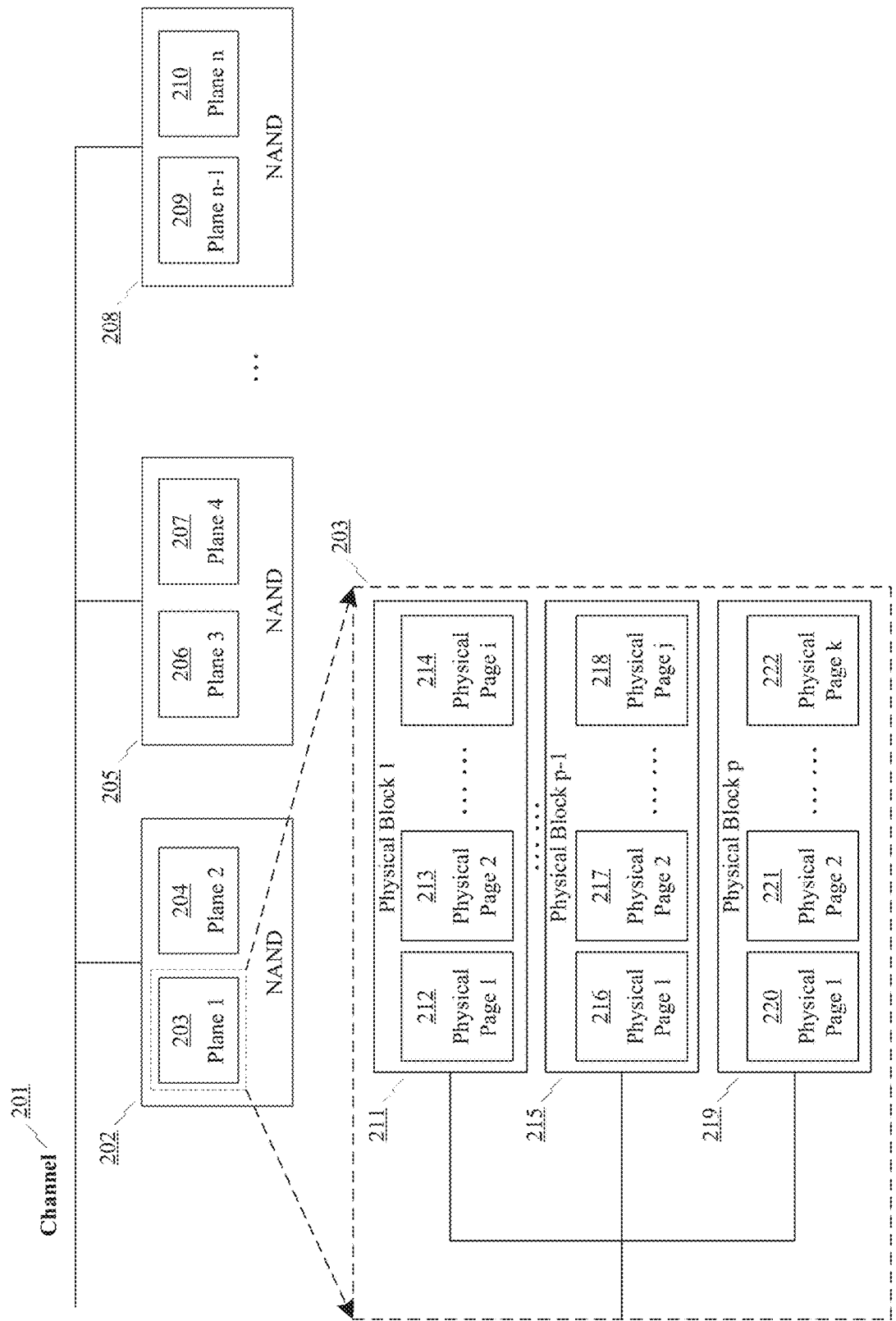
FIG. 2 is an illustration of an exemplary internal NAND flash structure of an SSD, according to some embodiments of the present disclosure.

FIG. 2 is an illustration of an exemplary internal NAND flash structure of an SSD, according to some embodiments of the present disclosure. As stated above, a storage controller (e.g., storage controller 104 of FIG. 1) of an SSD is connected with one or more NAND flash integrated circuits ("ICs"), which is where data received by the SSD is ultimately stored. Each NAND IC 202, 205, and 208 typically comprises one or more planes. Using NAND IC 202 as an example, NAND IC 202 comprises planes 203 and 204. As stated above, each plane comprises one or more physical blocks. For example, plane 203 comprises physical blocks 211, 215, and 219. Each physical block comprises one or more physical pages, which, for physical block 211, are physical pages 212, 213, and 214.

An SSD typically stores a single bit in a transistor using the voltage level present (high or ground) to indicate a 0 or 1. Some SSDs also store more than one bit in a transistor using more voltage levels to indicate more values (e.g., 00, 01, 10, and 11 for two bits). Assuming an SSD stores only a single bit for simplicity, an SSD can write a 1 (e.g., can set the voltage of a transistor to high) to a single bit in a page. An SSD cannot write a zero (e.g., cannot set the voltage of a transistor to low) to a single bit in a page. Rather, an SSD can write a zero on a block-level. In other words, to set a bit of a page to zero, an SSD can set every bit of every page within a block to zero. By setting every bit to zero, an SSD can ensure that, to write data to a page, the SSD needs to only write a 1 to the bits as dictated by the data to be written, leaving untouched any bits that are set to zero (since they are zeroed out and thus already set to zero). This process of setting every bit of every page in a block to zero to accomplish the task of setting the bits of a single page to zero is known as garbage collection, since what typically causes a page to have non-zero entries is that the page is storing data that is no longer valid ("garbage data") and that is to be zeroed out (analogous to garbage being "collected") so that the page can be re-used.

Further complicating the process of garbage collection, however, is that some of the pages inside a block that are to be zeroed out may be storing valid data—in a worst case, all of the pages inside the block except the page needing to be garbage collected are storing valid data. Since the SSD needs to retain valid data, before any of the pages with valid data can be erased, the SSD (usually through its storage controller) needs to transfer each valid page's data to a new page in a different block. Transferring the data of each valid page in a block is a resource intensive process, as the SSD's storage controller transfers the content of each valid page to a buffer and then transfers content from the buffer into a new page. Only after the process of transferring the data of each valid page is finished may the SSD then zero out the original page (and every other page in the same block). As a result, in general the process of garbage collection involves reading the content of any valid pages in the same block to a buffer, writing the content in the buffer to a new page in a different block, and then zeroing-out every page in the present block.

The impact of garbage collection on an SSD's performance is further compounded by two other limitations imposed by the architecture of SSDs. The first limitation is that only a single page of a block may be read at a time. Only being able to read a single page of a block at a time forces the process of reading and transferring still valid pages to be done sequentially, substantially lengthening the time it takes for garbage collection to finish. The second limitation is that only a single block of a plane may be read at a time. For the entire duration that the SSD is moving these pages—and then zeroing out the block—no other page or block located in the same plane may be accessed.

Cloud service providers deploy a tremendous number of servers to provide a broad spectrum of users with a virtualized computing environment to consistently meet the users' computing and storage requirements. In recent years, flash drives (e.g., SSDs) have emerged as one of the better choices for storage drives used in cloud service providers. For a typical cloud service provider, usually not all customers are simultaneously active. Finding efficient ways to maintain the tremendous amount of user data on flash drives is a challenging topic for utilization improvement and cost reduction.

Figure 3:
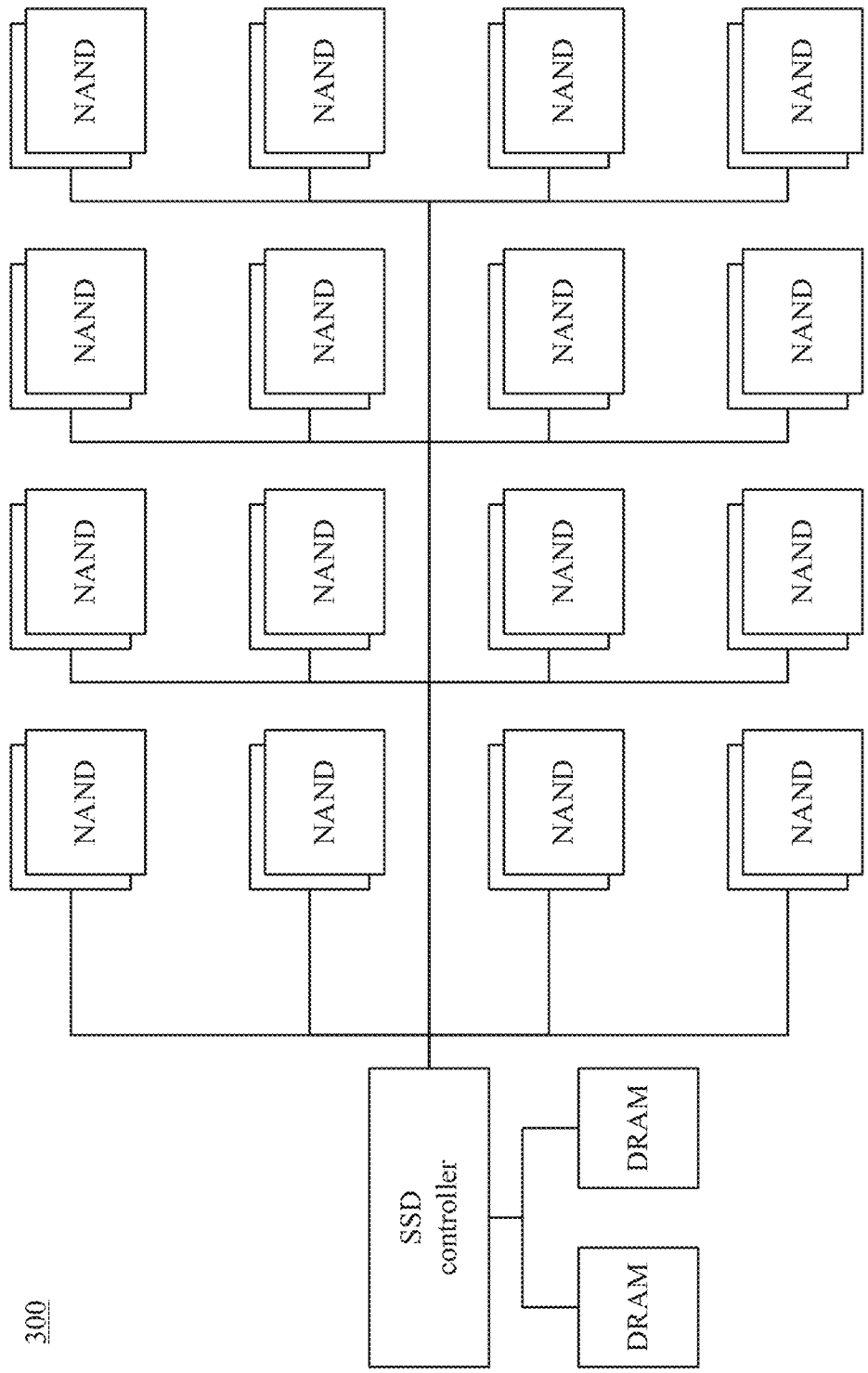
FIG. 3 is an illustration of an example high-capacity SSD with full addressing activated, according to some embodiments of the present disclosure.

One method to improve utilization of flash drives involves assigning data of multiple virtual machines into a single flash drive. FIG. 3 is an illustration of an example high-capacity SSD with full addressing activated, according to some embodiments of the present disclosure. As shown in FIG. 3, SSD 300 comprises a plurality of NAND dies. Data from several virtual machines is mixed together and stored in the plurality of NAND dies. Although the virtualization process can make the storage space appear as multiple standalone drives, data stored in the physical medium is commingled.

In the SSD shown in FIG. 3, when one virtual machine is in an active state, all the NAND dies in SSD 300 may be turned on and operating at full power, even if most of the other virtual machines are inactive. As a result, there are a number of constraints associated with the system shown in FIG. 3. First, all of the NAND dies may always be on. Because multiple virtual machines can store data in the flash drive, data is placed into several NAND dies without a determined pattern due to host writes and the following garbage collection. As a result, the NAND dies need to be always active in case the data is read. Second, the flash drive may need to hold a full logical-to-physical mapping table at all times to ensure that each NAND die can be accessed constantly. Storing the full logical-to-physical mapping table can consume a large amount of memory space. For example, if every 4 kB of memory needs to take up one entry in the mapping table, with each entry taking up 4 bytes of memory, an SSD with 4 TB of memory can result in 4 GB of mapping table memory. If there are 15 SSDs, the mapping table for the 15 SSDs can take up to 60 GB of memory, which is significant for a host system or a memory storage on the host system. Moreover, the consumption of host processor resources (e.g., CPUs) for SSD is not optimal. For example, CPU cores based on the x86 architecture are powerful, but very expensive. As a result, these CPU cores could be used for more important processing tasks. Third, because all the NAND dies needs to be always kept on and the full mapping table needs to be stored, the power consumption for the flash drive remains high.

Figure 4:
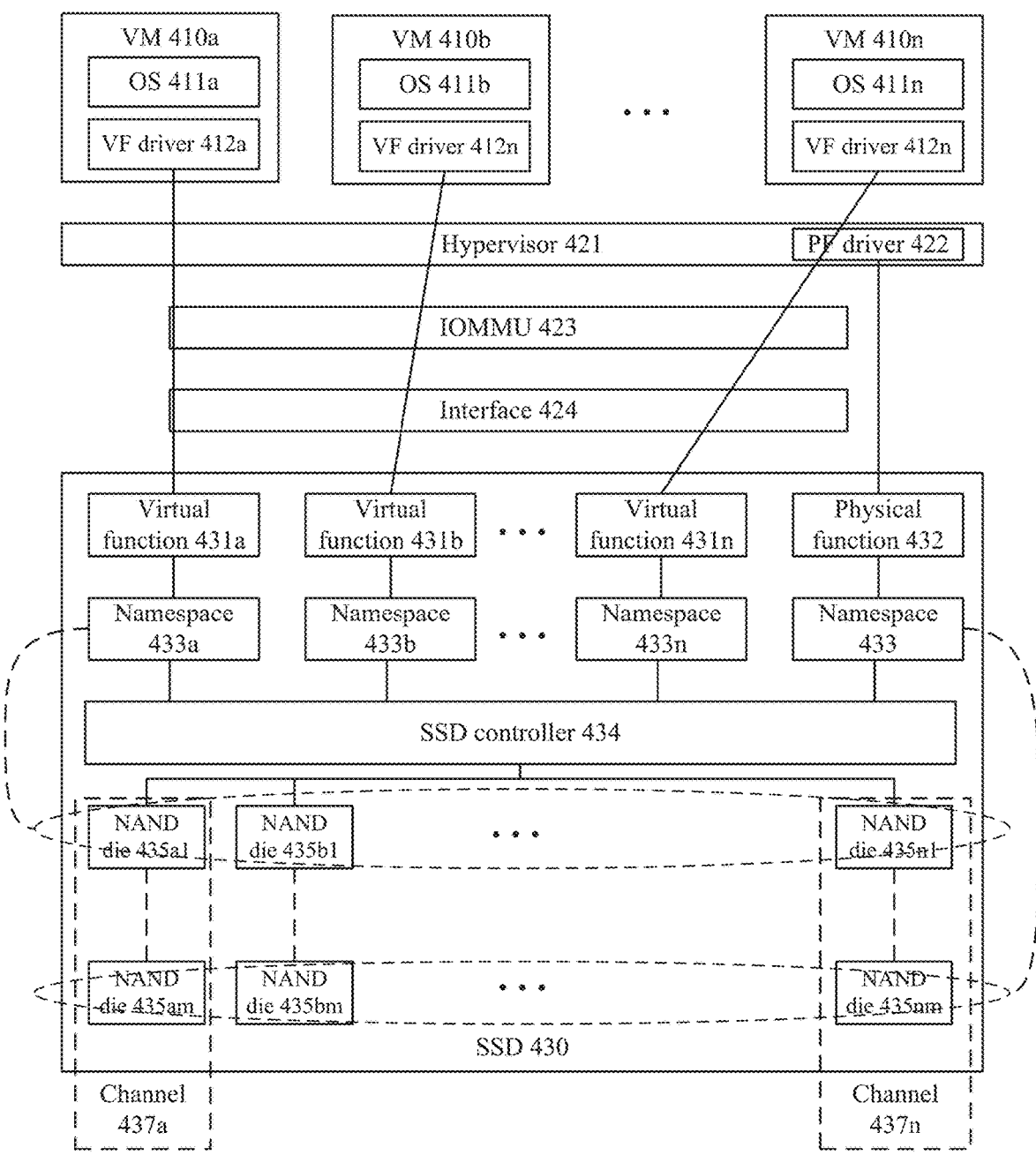
FIG. 4 is an illustration of an example system organization and hierarchy for a flash drive in a virtualized environment, according to some embodiments of the present disclosure.

Embodiments of the present disclosure provide systems and methods to resolve the issues discussed above by providing resource and power savings through the SSD's internal management. FIG. 4 is an illustration of an example system organization for a flash drive in a virtualized environment, according to some embodiments of the present disclosure. As shown in FIG. 4, system 400 comprises one or more virtual machines (e.g., guests) 410. In some embodiments, a virtual machine (e.g., virtual machine 410a) can include an operation system (e.g., operation system 411a). As shown in FIG. 4, the one or more virtual machines 410 can be paired to one or more virtual functions 431 provided in SSD 430. In some embodiments, a virtual machine (e.g., virtual machine 410*a*) can comprise a virtual function driver (e.g., virtual function driver 412*a*), and the virtual machine can be paired with a virtual function (e.g., virtual function 431*a*) via the virtual function driver. In some embodiments, system 400 further comprises hypervisor 421, input-output memory management unit ("IOMMU") 423, or interface 424. A virtual machine (e.g., virtual machine 410*a*) can be paired with a virtual function (e.g., virtual function 431*a*) via hypervisor 412, IOMMU 423, or interface 424. In some embodiments, interface 424 is a peripheral component interconnect express ("PCIe") bus. It is appreciated that virtual machines described in the present disclosure is a general concept in virtualization, and virtual machines can also be dockers or containers in a virtualized environment.

In some embodiments, as shown in FIG. 4, SSD 430 further comprises one or more namespaces 433. A virtual function (e.g., virtual function 431*a*) can be assigned with a namespace (e.g., namespace 433*a*). As a result, in some embodiments, one namespace 433 can correspond to one virtual machine 410 or one guest of system 400. In some embodiments, namespace 433 is a logical concept inside the SSD, and namespace 433 may be implemented in software.

In some embodiments, as shown in FIG. 4, SSD 430 further comprises a plurality of NAND dies 435. In some embodiments, a plurality of NAND dies 435 can be grouped into one channel 437. For example, NAND dies 435*a*1 to 435*am* can be grouped into channel 437*a*. Moreover, one or more dies 435 can be assigned to one namespace 433. For example, NAND dies 435*a*1 to 435*n*1 can be assigned to namespace 433*a*. In some embodiments, a plurality of dies from different channels can be assigned to one namespace 433. For example, as shown in FIG. 4, a first row of NAND dies 435 (e.g., NAND dies 435*a*1 to 435*n*1) across different channels 437 can be assigned to one namespace 433 (e.g., namespace 433*a*). In some embodiments, SSD 430 can enable parallel access across NAND dies in different channels. As a result, when NAND dies from multiple channels are assigned to a namespace, the virtual machine corresponding to the namespace can perform parallel memory operations on the NAND dies concurrently, improving the I/O bandwidth of SSD 430 for the virtual machine. In some embodiments, SSD 430 further comprises SSD controller 434, and NAND dies 435 can be assigned to namespaces 433 or virtual functions 431 via SSD controller 434. Since each of the one or more namespaces 433 is assigned a different group of NAND dies 435, data from different virtual machines can be separated and stored in different NAND dies. In some embodiments, SSD controller 434 comprises one or more processors configured to perform data management on the plurality of NAND dies 435.

In some embodiments, not all virtual machines are active at the same time. For example, as shown in FIG. 4, virtual machine 410*b* may be active or operating in an active status, while virtual machine 410*a* is inactive or operating in an inactive status. In some embodiments, a status of virtual machine 410*a* can become inactive when virtual machine 410*a* has not made memory requests for or during a period of time. For example, if virtual machine 410*a* has not made an access or update operation on SSD 430 in a period of 5 minutes, virtual machine 410*a* can be considered as inactive. When a virtual machine is inactive, one or more of its corresponding NAND dies can also change their status. For example, the one or more of the corresponding NAND dies can also be turned off or enter hibernation with a lower power consumption, hence reducing the overall power consumption of the SSD. In system 400 shown in FIG. 4, when virtual machine 410*a* is inactive, NAND dies 435*a*1, 435*b*1, or 435*n*1 that are assigned to virtual machine 410*a* or corresponding namespace 433*a* can also be turned off or enter hibernation with a lower power consumption. In some embodiments, when a virtual machine is inactive, all of the NAND dies assigned to the virtual machine can be turned off or enter hibernation with a lower power consumption.

In some embodiments, virtual functions 431 or namespaces 433 can be implemented or realized outside of SSD 430. For example, SSD 430 can be an open-channel SSD, and memory management functionalities, such as virtual functions and namespaces, can be implemented in a host that is communicatively coupled to the SSD. In some embodiments, when a virtual machine is inactive, its logical-to-physical mapping table can be removed from a memory (not shown in FIG. 4) in a host to reduce the resource utilization in memory capacity and memory bandwidth.

Figure 5:
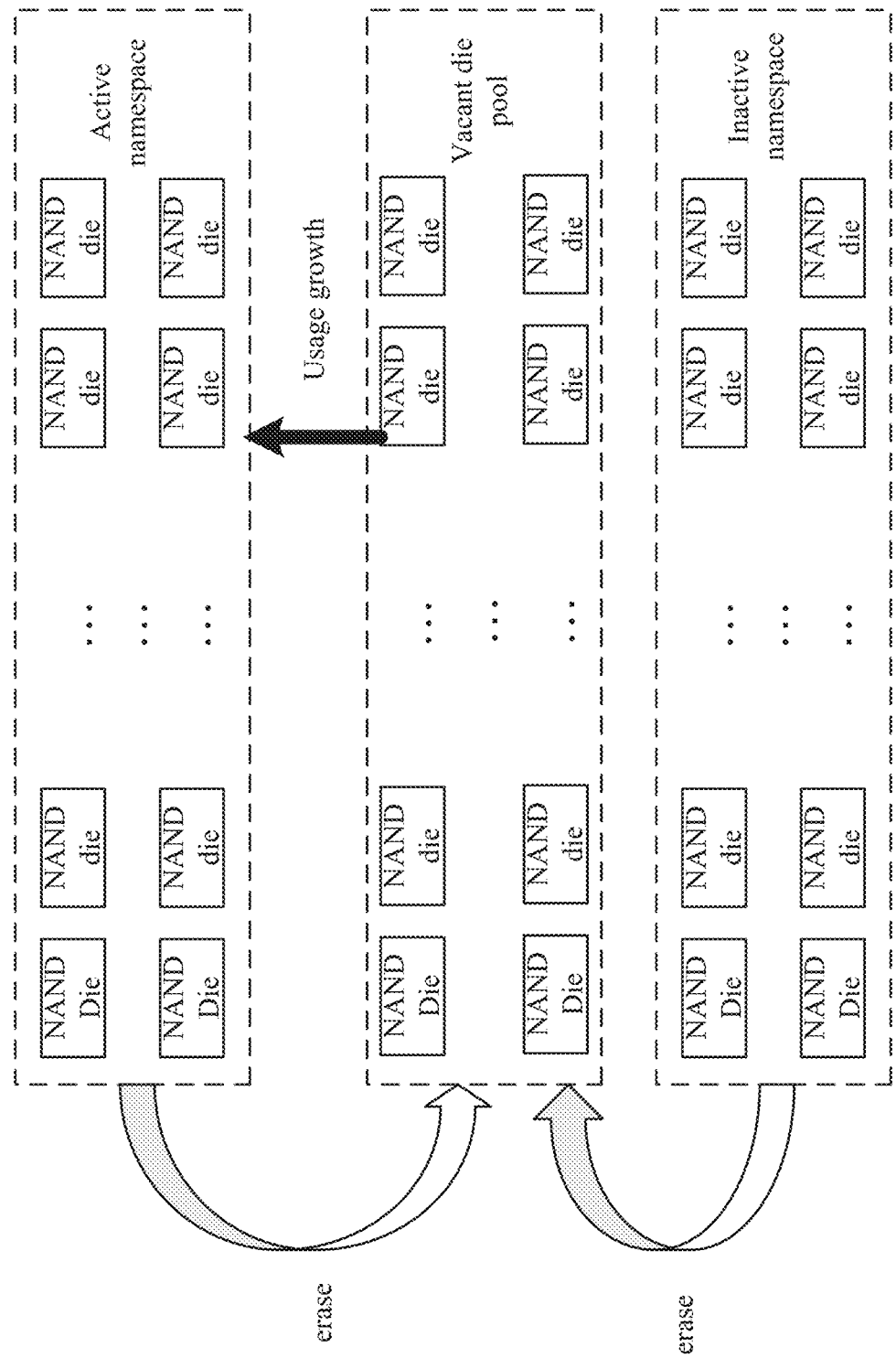
FIG. 5 is an illustration of an example management of NAND dies, according to some embodiments of the present disclosure.

In some embodiments, NAND dies belonging to a flash drive can be dynamically allocated to virtual machines based on demand. For example, a guest using a virtual machine can require more capacity, and the system can locate vacant NAND dies and assign the NAND dies to the virtual machine. FIG. 5 is an illustration of an example management of NAND dies, according to some embodiments of the present disclosure. As shown in FIG. 5, NAND dies in a flash drive (e.g., an SSD) can be grouped into three groups—NAND dies assigned to active namespaces, NAND dies in a vacant pool (e.g., hibernation), and NAND dies in inactive namespaces. Each of the groups can represent statuses for the NAND dies in each group. NAND dies in the vacant pool or inactive namespaces can be turned off or enter hibernation mode with a lower power consumption. When virtual machine usage increases and there is a need for additional NAND dies or when more virtual machines are activated, one or more NAND dies from the vacant pool can be assigned to the namespace corresponding to the virtual machine, and the NAND dies can be grouped into the active namespaces.

In some embodiments, when usage of a virtual machine decreases, and some of the NAND dies can be freed, the NAND dies can be turned off or enter hibernation mode with a lower power consumption. Moreover, the NAND dies can be removed from the group of active namespaces and grouped into the vacant pool. In some embodiments, a virtual machine can become inactive, and one or more NAND dies assigned to the virtual machines can be turned off or enter hibernation mode with a lower power consumption. Similarly, the NAND dies can be removed from the group of active namespaces and grouped into the vacant pool. In some embodiments, NAND dies in the vacant pool can be freed. For example, a virtual machine can be removed from the system. As a result, the NAND dies in the vacant pool can be removed from the vacant pool and grouped into inactive namespaces.

In some embodiments, NAND dies can undergo systematic (e.g., periodic) garbage collections. Because of the need to undergo garbage collections, these NAND dies can be kept in the active namespace so that garbage collections can be initiated and conducted.

In some embodiments, servers or virtual machines are deployed gradually. For example, when a user or guest to a system (e.g., system 400 of FIG. 4) makes a request for a computing or storage capacity, servers can be gradually deployed to the user based on the actual need of the computer power and storage capacity. However, the granularity at the server level can still be coarse. As a result, when a server is deployed, its entire storage capacity may not be used right away. Some of the storage capacity from the server can keep consuming power and memory until that portion of the storage capacity is used. Therefore, in systems shown in FIG. 4 and FIG. 5, vacant storage capacity in a server can be properly managed, and the vacant storage capacity can consume less power. For example, as shown in FIG. 5, NAND dies can be recycled from active namespaces and inactive namespaces to the vacant pool.

Figure 6:
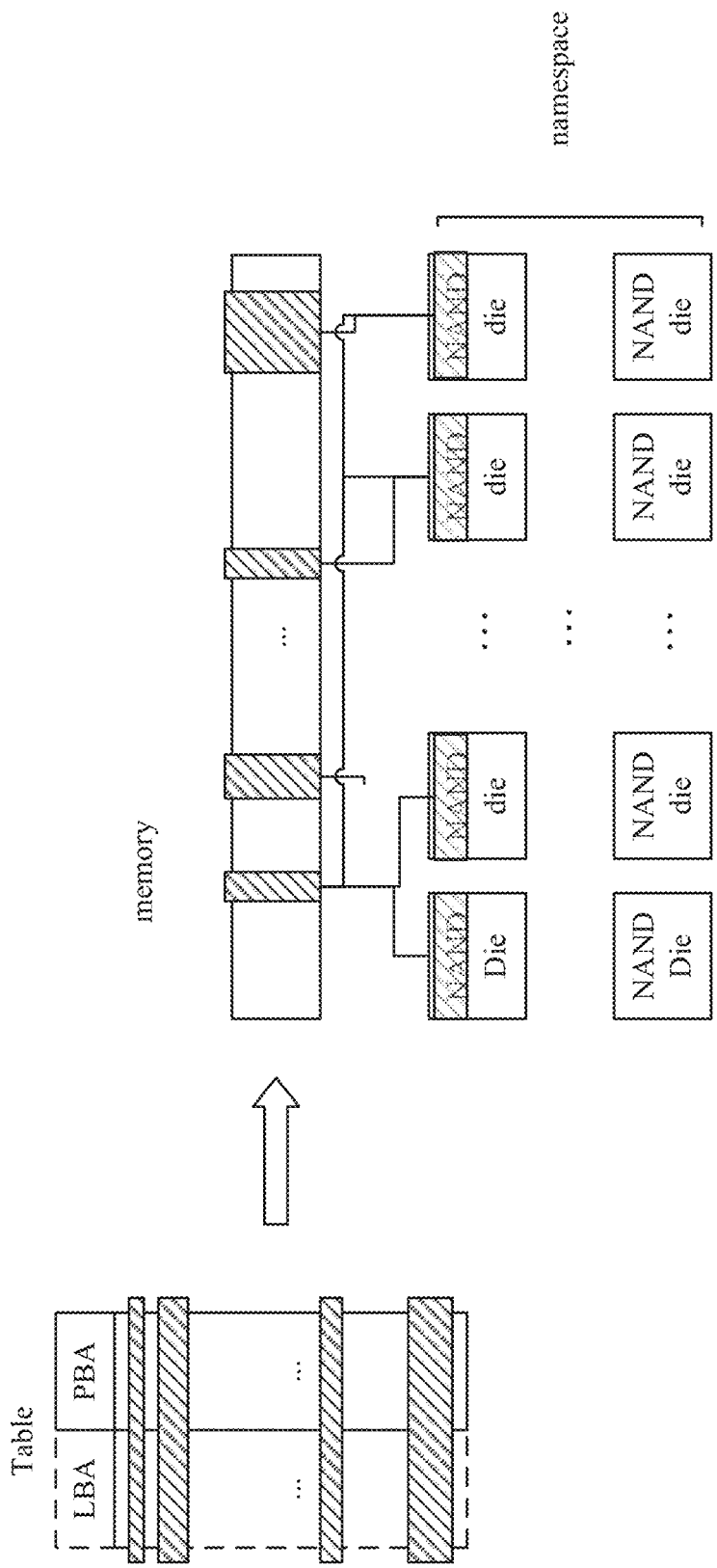
FIG. 6 is an illustration of an example management of mapping tables, according to some embodiments of the present disclosure.

In some embodiments, when a virtual machine is inactive or turned off, the physical-to-logical mapping table corresponding to the virtual machine can be removed from memory to reduce memory usage and bandwidth utilization. FIG. 6 is an illustration of an example management of mapping tables, according to some embodiments of the present disclosure. As shown in FIG. 6, shaded regions in the physical-to-logical mapping table correspond to mapping information of virtual machines that are becoming inactive. When one namespace is inactive, its mapping table can be written into one or more NAND dies under the same namespace. The one or more NAND dies can then enter a lower power consumption mode. When the one or more NAND dies are activated (e.g., moved into active namespace shown in FIG. 5), the mapping tables can be read out from the one or more NAND dies and saved into memory, so the mapping tables can be used for operations conducted on the one or more NAND dies. It is appreciated that the management of mapping tables shown in FIG. 6 can be implemented in system 400 of FIG. 4.

Figure 7:
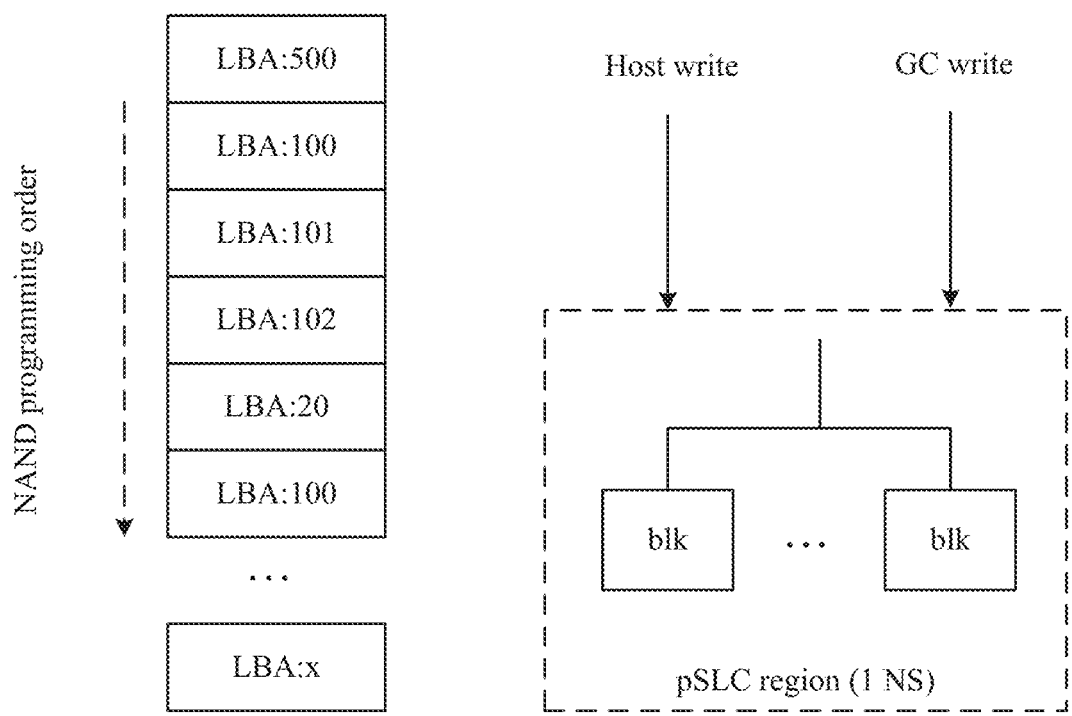
FIG. 7 is an illustration of an example procedure of writing mapping information into NAND dies, according to some embodiments of the present disclosure.

In some embodiments, the NAND dies storing the mapping table can be configured as pseudo single-level cell ("pSLC") to reduce latency in reading and writing of the mapping table and accelerate operations. FIG. 7 is an illustration of an example procedure of writing mapping information into NAND dies, according to some embodiments of the present disclosure. As shown in FIG. 7, when a virtual machine becomes inactive and the corresponding mapping table needs to be stored into the SSD, the logical block addresses ("LBA") can be written into the pSLC of the SSD. In some embodiments, the ordering of LBAs follows NAND programming sequences in the namespace's physical medium. In some embodiments, there can be two sources of NAND programming, namely operations from a host and or operations from garbage collection. For example, a host can choose to insert or update a mapping between an LBA and a PBA. Also, a garbage collection process can move data from one PBA to another PBA. As a result, the garbage collection process can also insert or update a mapping between an LBA and a PBA. Either the host or garbage collection can write data into a multi-level cell ("MLC") region and the corresponding LBAs into the pSLC region. In some embodiments, the ordering of the LBAs is kept in a manner that is consistent with the data programmed into the namespace. In some embodiments, for a random write, the LBA content can appear out-of-order. It is appreciated that the procedure shown in FIG. 7 can be implemented in system 400 of FIG. 4.

Figure 8:
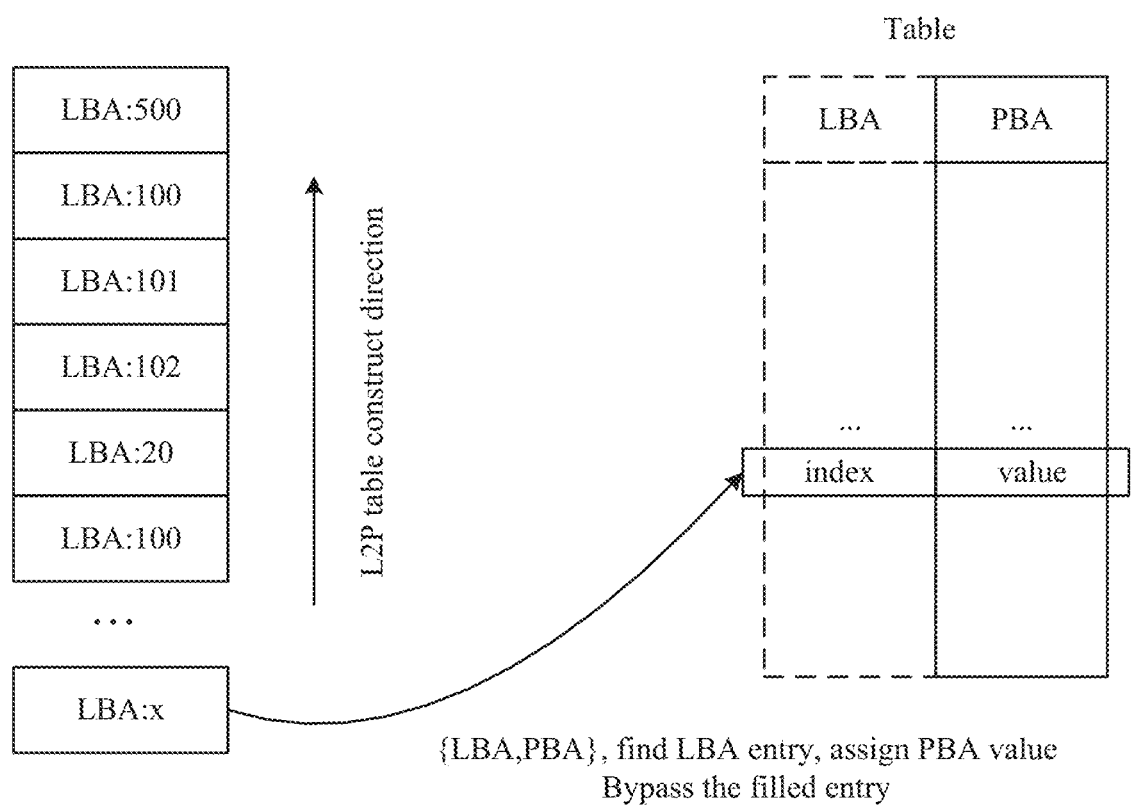
FIG. 8 is an illustration of an example procedure to extract a mapping table from a flash drive when a corresponding virtual machine is active, according to some embodiments of the present disclosure.

In some embodiments, when a namespace is inactive, NAND dies corresponding to the namespace can enter hibernation except for a small amount of NAND blocks reserved for background operations such as garbage collections, data refresh, etc. Later, the namespace can become active again for the usage of the virtual machine that corresponds to the namespace. In some embodiments, when a virtual machine is launched or re-activated, a corresponding namespace can be triggered to build a mapping table in memory. The mapping table stored in memory can provide low-latency accesses. FIG. 8 is an illustration of an example procedure to extract a mapping table from a flash drive when a corresponding virtual machine is active, according to some embodiments of the present disclosure. It is appreciated that the procedure shown in FIG. 8 can be implemented in system 400 of FIG. 4. In some embodiments, the procedure shown in FIG. 8 can correspond to the procedure shown in FIG. 7. For example, when a virtual machine becomes inactive, its mapping table can be saved into the SSD according to the procedure shown in FIG. 7, and when the virtual machine becomes active, its mapping table can be extracted from the SSD according to the procedure shown in FIG. 8.

In some embodiments, as shown in FIG. 8, a storage location in the one or more dies (e.g., pSLC region of the one or more dies) can be scanned in an order that is reversed from the order by which the mapping table is saved. For example, if the order of saving is from top to bottom (e.g., the order shown in FIG. 7), the order of scanning to extract the mapping table can be from bottom to top. In some embodiments, for every LBA that is read out, its corresponding PBA can be interpreted from the location where the LBA is read out, and the LBA can be used as the mapping table's index to locate the table entry. Then, the entry's value corresponding to the index can be filled with the PBA to establish one mapping. In some embodiments, LBAs closer to the bottom are written later than LBAs closer to the top. As a result, during the scan from the bottom, if the same LBA is read out and it is the former version, the rebuilding can discard the read of the former version and move on to process the next entry. This could save the time spent on comparing different versions. For example, as shown in FIG. 8, there are two LBA entries with value "100." The entry near the bottom is newer than the entry near the top. As a result, when the rebuilding process reads the entry near the top, the process can recognize that this entry is an obsolete entry and discard the entry. In some embodiments, since the mapping table can be arranged according to an order of LBA (e.g., ascending order), the column of the LBAs is not necessary and can be removed. As a result, the mapping table can maintain the PBA information only.

Embodiment of the present disclosure provide systems and methods to achieve resource savings, including savings on memory capacity, bus throughput, and power consumption. When virtual machines are inactive, the systems can determine corresponding namespaces and make NAND dies corresponding to the namespaces operate in lower power mode. As a result, the NAND dies storing data and operation status can consume reduced power during hibernation. At the same time, the NAND dies can resume to normal operation state in a short period of time. Moreover, the mapping tables associated with virtual machines can also be safely removed from memory when virtual machines are inactive, further optimizing the system's usage of memory space.

Figure 9:
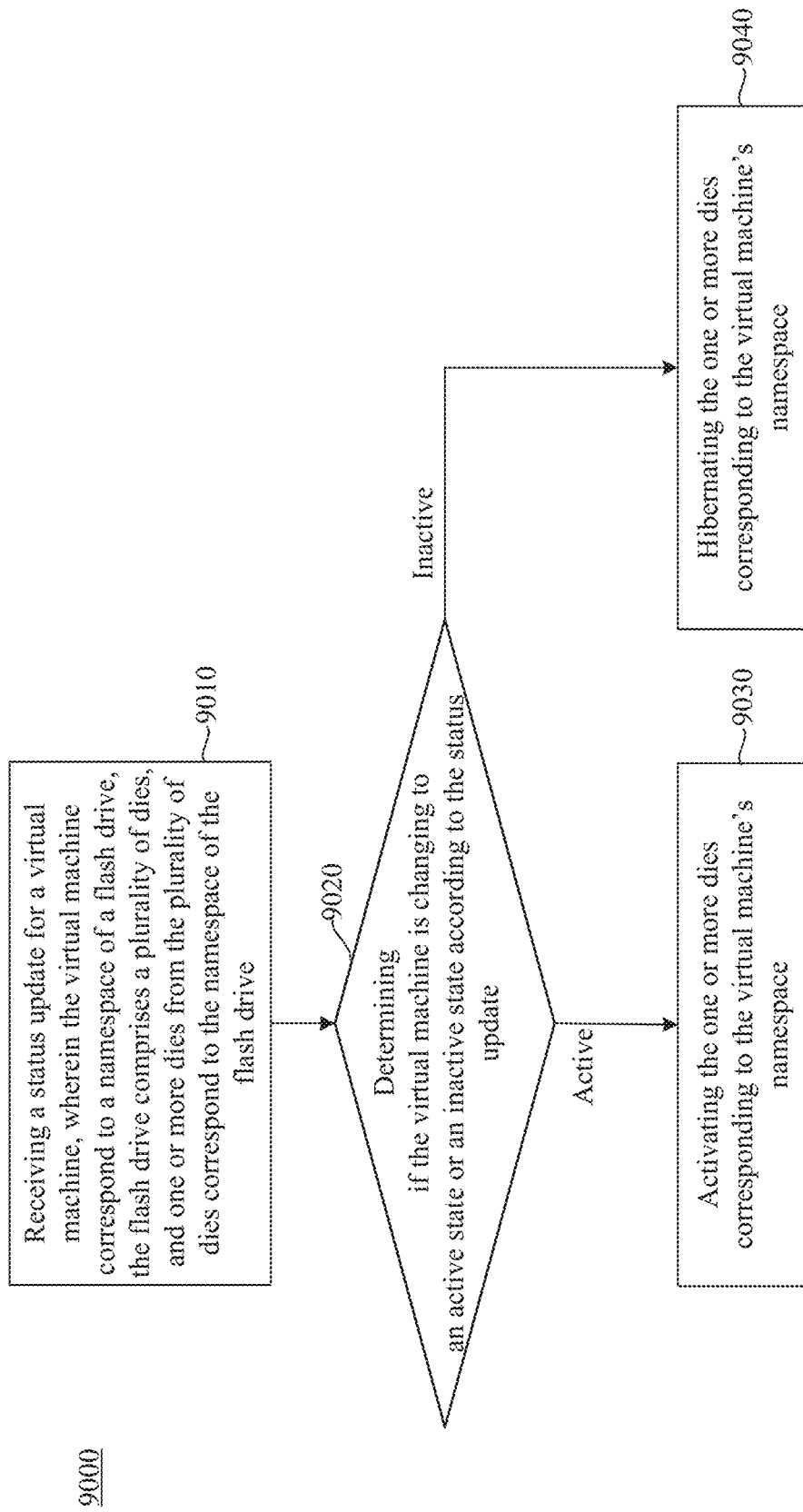
FIG. 9 is an illustration of an example method for managing flash drives in a virtualized environment, according to some embodiments of the present disclosure.

Embodiments of the present disclosure further provides methods for managing flash drives to achieve resource and power savings. FIG. 9 is an illustration of an example method for managing flash drives in a virtualized environment, according to some embodiments of the present disclosure. It is appreciated that method 9000 of FIG. 9 can be executed on system 400 shown in FIG. 4.

In step S9010, a status update for a virtual machine is received. In some embodiments, the virtual machine operates on a flash drive, and the flash drive comprises a plurality of dies. The virtual machine corresponds to a namespace, which comprises one or more dies from the plurality of dies. For example, as shown in FIG. 4, virtual machine 410*a* corresponds to namespace 433a, which comprises NAND dies 435a1 to 435n1. In some embodiments, the flash drive is an SSD, and the dies are NAND dies. In some embodiments, the virtual machine can be a docket or a container in a virtualized environment.

In some embodiments, there can be a plurality of virtual machines storing data in the flash drive, and the plurality of virtual machines are in different states. For example, as shown in FIG. 4, virtual machine 410b may be active, while virtual machine 410a is inactive. In some embodiments, the one or more dies corresponding to the virtual machine's namespace belong to different channels on the flash drive. For example, as shown in FIG. 4, NAND dies 435a1 to 435n1 correspond to namespace 433a, and they belong to different channels (e.g., channels 437a and 437n).

Referring back to FIG. 9, in step S9020, it is determined if the virtual machine is changing to an active state or an inactive state according to the status update. In some embodiments, the virtual machine is changing to an inactive state when the virtual machine has not made memory requests to the flash drive for or during a period of time. For example, as shown in FIG. 4, if virtual machine 410a has not made an access or update operation on SSD 430 in a period of 5 minutes, virtual machine 410a can be considered as inactive.

In step S9030, in response to the virtual machine changing into an active state, the one or more dies corresponding to the virtual machine's namespace can be activated. For example, as shown in FIG. 5, when a virtual machine is activated, some of the NAND dies corresponding to the virtual machine's namespace can be assigned to the active namespace from the vacant pool.

In some embodiments, in response to the virtual machine changing into an active state, a logical-to-physical mapping table corresponding to the virtual machine can be extracted from the one or more dies corresponding to the namespace and written into memory. For example, as shown in FIG. 8, when a virtual machine becomes active, the LBAs written into the SSD can be extracted (e.g., in a reverse order), and the corresponding PBAs can be interpreted from the location where the LBA is read out.

Referring back to FIG. 9, in step S9040, in response to the virtual machine changing into an inactive state, the one or more dies corresponding to the virtual machine's namespace can hibernate. For example, as shown in FIG. 5, when a virtual machine is inactive, some of the NAND dies corresponding to the virtual machine's namespace can be assigned to the vacant pool from the active namespace. As shown in FIG. 4, when virtual machine 410a is changing into an inactive state, NAND dies 435a1 to 435n1 corresponding to namespace 433a can enter a hibernation mode. In the hibernation mode, the NAND dies 435a1 to 435n1 can operate in a lower-power state. In some embodiments, the hibernation mode can also include turning off the NAND dies.

In some embodiments, in response to the virtual machine changing into an inactive state, a logical-to-physical mapping table corresponding to the virtual machine can be removed from a memory and written into the one or more dies corresponding to the namespace. For example, as shown in FIG. 7, when a virtual machine becomes inactive, the LBAs can be written into the SSD, such as a pSLC of the SSD.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, SSD, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The host system, operating system, file system, and other functional units described in this disclosure can be implemented by hardware, or software, or a combination of hardware and software. One of ordinary skill in the art will also understand that multiple ones of the above described functional units may be combined as one functional unit, and each of the above described functional units may be further divided into a plurality of functional sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The embodiments may further be described using the following clauses:

1. A method, comprising:
receiving a status update for a virtual machine, wherein the virtual machine stores data in a flash drive, the flash drive comprises a plurality of dies, and one or more dies from the plurality of dies correspond to the virtual machine;

determining, according to the status update, if the virtual machine has changed to an active state or an inactive state; and in response to a determination that the virtual machine has changed, updating a status of the one or more dies that correspond to the virtual machine, wherein the status of the one or more dies is updated to hibernating in response to the determination that the virtual machine has changed to the inactive state, and the status of the one or more dies is updated to activated in response to the determination that the virtual machine has changed to the active state.

2. The method of clause 1, wherein: in response to a determination that the virtual machine has changed to the inactive state, updating the status of the one or more dies further comprises:

removing a logical-to-physical mapping table corresponding to the virtual machine from memory, and writing the logical-to-physical mapping table to the one or more dies corresponding to the virtual machine.

3. The method of clause 2, wherein writing the logical-to-physical mapping table to the one or more dies corresponding to the virtual machine further comprises:

writing the logical-to-physical mapping table into pseudo single-level cells in the one or more dies corresponding to the virtual machine.

4. The method of any one of clauses 1-3, wherein:

in response to a determination that the virtual machine has changed to the active state, updating the status of the one or more dies further comprises:

extracting a logical-to-physical mapping table corresponding to the virtual machine from the one or more dies corresponding to the virtual machine.

5. The method of any one of clauses 1-4, wherein:

the flash drive stores data for a plurality of virtual machines;

each of the plurality of virtual machines correspond to a group of dies that is different from the one or more dies corresponding to the virtual machine; and at least one or more of the plurality of virtual machines are in different states.

6. The method of any one of clauses 1-5, wherein the plurality of dies in the flash drive can be dynamically allocated to the virtual machine.

7. The method of any one of clauses 1-6, wherein the status of the one or more dies is updated to hibernating in response to the determination that the virtual machine has changed to the inactive state comprises:

updating the status of the one or more dies that correspond to the virtual machine to turned off.

8. The method of any one of clauses 1-7, wherein the one or more dies corresponding to the virtual machine belong to different channels on the flash drive.

9. The method of any one of clauses 1-8, wherein the flash drive is a solid-state drive.

10. The method of any one of clauses 1-9, wherein the one or more dies corresponding to the virtual machine are a part of a namespace that corresponds to the virtual machine.

11. The method of clause 10, wherein the namespace that corresponds to the virtual machine is implemented in software outside of the flash drive.

12. The method of any one of clauses 1-11, wherein the virtual machine is a docket or a container in a virtualized environment.

13. A non-transitory computer readable medium that stores a set of instructions that is executable by at least one processor of a computer system to cause the computer system to perform a method, the method comprising:

receiving a status update for a virtual machine, wherein the virtual machine stores data in a flash drive, the flash drive comprises a plurality of dies, and one or more dies from the plurality of dies correspond to the virtual machine;

determining, according to the status update, if the virtual machine has changed to an active state or an inactive state;

in response to a determination that the virtual machine has changed to an inactive state, hibernating the one or more dies to hibernating; and in response to a determination that the virtual machine has changed to an active state, activating the one or more dies.

14. The non-transitory computer readable medium of clause 13, wherein the set of instructions is executable by the at least one processor of the computer system to cause the computer system to further perform:

in response to a determination that the virtual machine has changed to the inactive state:

removing a logical-to-physical mapping table corresponding to the virtual machine from memory, and writing the logical-to-physical mapping table to the one or more dies corresponding to the virtual machine.

15. The non-transitory computer readable medium of clause 13 or 14, wherein the set of instructions is executable by the at least one processor of the computer system to cause the computer system to further perform:

in response to a determination that the virtual machine has changed to the active state, extracting a logical-to-physical mapping table corresponding to the virtual machine from the one or more dies corresponding to the virtual machine.

16. A system, comprising:

a flash drive comprising a plurality of dies; and a memory configured to store a mapping associating a first virtual machine with a first set of dies of the plurality of dies and a second virtual machine with a second set of dies of the plurality of dies, wherein:

the first set of dies are hibernated in response to the first virtual machine changing to an inactive state; and the first set of dies are activated in response to the first virtual machine changing to an active state.

17. The system of clause 16, wherein:

the mapping associating the first virtual machine with the first set of dies comprises a logical-to-physical mapping table corresponding to the first virtual machine, the logical-to-physical mapping table corresponding to the first virtual machine is removed from the memory in response to the first virtual machine changing to an inactive state, and the logical-to-physical mapping table is written to the first set of dies in response to the first virtual machine changing to an inactive state.

18. The system of clause 16 or 17, wherein a logical-to-physical mapping table corresponding to the first virtual machine is extracted from the first set of dies in response to the first virtual machine changing to an active state.

19. The system of any one of clauses 16-18, wherein the first set of dies belong to different channels on the flash drive.

20. The system of any one of clauses 16-19, wherein the first set of dies corresponding to the first virtual machine is a part of a namespace that corresponds to the first virtual machine.

21. The system of any one of clauses 16-20, wherein:

the second set of dies are hibernated in response to the second virtual machine changing to an inactive state, and the second set of dies are activated in response to the second virtual machine changing to an active state.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method, comprising:
   receiving a status update for a virtual machine, wherein the virtual machine stores data in a flash drive, the flash drive comprises a plurality of dies, and one or more dies from the plurality of dies correspond to the virtual machine;
   determining, according to the status update, if the virtual machine has changed to an active state or an inactive state; and
   in response to a determination that the virtual machine has changed, updating a status of the one or more dies that correspond to the virtual machine, wherein the status of the one or more dies is updated to hibernating in response to the determination that the virtual machine has changed to the inactive state, and the status of the one or more dies is updated to activated in response to the determination that the virtual machine has changed to the active state.

2. The method of claim 1, wherein:
   in response to a determination that the virtual machine has changed to the inactive state, updating the status of the one or more dies further comprises:
   removing a logical-to-physical mapping table corresponding to the virtual machine from memory, and
   writing the logical-to-physical mapping table to the one or more dies corresponding to the virtual machine.

3. The method of claim 2, wherein writing the logical-to-physical mapping table to the one or more dies corresponding to the virtual machine further comprises:
   writing the logical-to-physical mapping table into pseudo single-level cells in the one or more dies corresponding to the virtual machine.

4. The method of claim 1, wherein:
   in response to a determination that the virtual machine has changed to the active state, updating the status of the one or more dies further comprises:
   extracting a logical-to-physical mapping table corresponding to the virtual machine from the one or more dies corresponding to the virtual machine.

5. The method of claim 1, wherein:
   the flash drive stores data for a plurality of virtual machines;
   each of the plurality of virtual machines correspond to a group of dies that is different from the one or more dies corresponding to the virtual machine; and
   at least one or more of the plurality of virtual machines are in different states.

6. The method of claim 1, wherein the plurality of dies in the flash drive can be dynamically allocated to the virtual machine.

7. The method of claim 1, wherein the status of the one or more dies is updated to hibernating in response to the determination that the virtual machine has changed to the inactive state comprises:
   updating the status of the one or more dies that correspond to the virtual machine to turned off.

8. The method of claim 1, wherein the one or more dies corresponding to the virtual machine belong to different channels on the flash drive.

9. The method of claim 1, wherein the flash drive is a solid-state drive.

10. The method of claim 1, wherein the one or more dies corresponding to the virtual machine are a part of a namespace that corresponds to the virtual machine.

11. The method of claim 10, wherein the namespace that corresponds to the virtual machine is implemented in software outside of the flash drive.

12. The method of claim 1, wherein the virtual machine is a docket or a container in a virtualized environment.

13. A non-transitory computer readable medium that stores a set of instructions that is executable by at least one processor of a computer system to cause the computer system to perform a method, the method comprising:
   receiving a status update for a virtual machine, wherein the virtual machine stores data in a flash drive, the flash drive comprises a plurality of dies, and one or more dies from the plurality of dies correspond to the virtual machine;
   determining, according to the status update, if the virtual machine has changed to an active state or an inactive state;
   in response to a determination that the virtual machine has changed to an inactive state, hibernating the one or more dies to hibernating; and
   in response to a determination that the virtual machine has changed to an active state, activating the one or more dies.

14. The non-transitory computer readable medium of claim 13, wherein the set of instructions is executable by the at least one processor of the computer system to cause the computer system to further perform:
   in response to a determination that the virtual machine has changed to the inactive state:
   removing a logical-to-physical mapping table corresponding to the virtual machine from memory, and
   writing the logical-to-physical mapping table to the one or more dies corresponding to the virtual machine.

15. The non-transitory computer readable medium of claim 13, wherein the set of instructions is executable by the at least one processor of the computer system to cause the computer system to further perform:
   in response to a determination that the virtual machine has changed to the active state, extracting a logical-to-physical mapping table corresponding to the virtual machine from the one or more dies corresponding to the virtual machine.

16. A system, comprising:
   a flash drive comprising a plurality of dies; and
   a memory configured to store a mapping associating a first virtual machine with a first set of dies of the plurality of dies and a second virtual machine with a second set of dies of the plurality of dies, wherein:
   the first set of dies are hibernated in response to the first virtual machine changing to an inactive state; and
   the first set of dies are activated in response to the first virtual machine changing to an active state.

17. The system of claim 16, wherein:
   the mapping associating the first virtual machine with the first set of dies comprises a logical-to-physical mapping table corresponding to the first virtual machine,
   the logical-to-physical mapping table corresponding to the first virtual machine is removed from the memory in response to the first virtual machine changing to an inactive state, and the logical-to-physical mapping table is written to the first set of dies in response to the first virtual machine changing to an inactive state.

18. The system of claim 16, wherein a logical-to-physical mapping table corresponding to the first virtual machine is extracted from the first set of dies in response to the first virtual machine changing to an active state.

19. The system of claim 16, wherein the first set of dies belong to different channels on the flash drive.

20. The system of claim 16, wherein the first set of dies corresponding to the first virtual machine is a part of a namespace that corresponds to the first virtual machine.

21. The system of claim 16, wherein:
the second set of dies are hibernated in response to the second virtual machine changing to an inactive state, and
the second set of dies are activated in response to the second virtual machine changing to an active state.

* * * * *